US011727733B2

(12) United States Patent
Christensen (10) Patent No.: US 11,727,733 B2
(45) Date of Patent: Aug. 15, 2023

(54) ENABLING OPERATOR CONTROLS FOR MACHINE OPERATION

(71) Applicant: Ford Global Technologies, LLC, Dearborn, MI (US)

(72) Inventor: Scott Christensen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 17/316,875

(22) Filed: May 11, 2021

(65) Prior Publication Data

US 2022/0366741 A1    Nov. 17, 2022

(51) Int. Cl.
*G07C 9/00* (2020.01)

(52) U.S. Cl.
CPC ..... *G07C 9/00309* (2013.01); *G07C 9/00944* (2013.01); *G07C 2009/00444* (2013.01)

(58) Field of Classification Search
CPC ............ G07C 9/00309; G07C 9/00944; G07C 2009/00444; H04L 2209/84; H04L 9/0891; H04L 9/14; B60R 25/24
See application file for complete search history.

(56) References Cited

U.S. PATENT DOCUMENTS

| 6,542,076 B1 * | 4/2003 | Joao ...................... B60R 25/102 340/425.5 |
| 8,330,571 B2 * | 12/2012 | Yamaguchi ............ B60R 25/04 340/426.36 |
| 8,351,600 B2 | 1/2013 | Resch |
| 8,749,345 B2 * | 6/2014 | Thompson ............ B60R 25/241 340/5.72 |
| 9,374,224 B2 | 6/2016 | Gilbert |
| 2002/0023223 A1 * | 2/2002 | Schmidt ................ H04L 9/3263 713/175 |
| 2003/0189482 A1 * | 10/2003 | Arshad .................... B60R 25/04 340/5.24 |
| 2005/0099265 A1 * | 5/2005 | Dix ..................... G07C 9/00309 340/5.21 |
| 2006/0280308 A1 * | 12/2006 | Anshel .................... A61M 1/14 380/46 |

(Continued)

FOREIGN PATENT DOCUMENTS

GB    2543858 B    10/2017

*Primary Examiner* — Brian E Miller
(74) *Attorney, Agent, or Firm* — Brandon Hicks; Bejin Bieneman PLC (57) ABSTRACT

A plurality of operator controls can, in an operation mode, operate a machine, and, in a validation mode, be disabled to operate the machine and selectable to provide inputs for a candidate key. A computing device can initialize the validation mode, including initializing the candidate key and, according to a number base, and a maximum storage length, of a stored key, an input multiplier; receive a plurality of inputs to the operator controls in the validation mode; determine respective numeric values of the inputs; add the candidate key to a product of the multiplier and the numeric value of a first input to update the candidate key; for each of one or more second inputs to the operator controls after the first input to the operator controls, determine whether the candidate key matches a stored key; and upon determining that the candidate key matches the stored key, output an authorization.

14 Claims, 3 Drawing Sheets

(56) References Cited

U.S. PATENT DOCUMENTS

| | | | |
|---|---|---|---|
| 2006/0290466 A1* | 12/2006 | Kamiya | G07C 9/00309 340/5.6 |
| 2009/0273434 A1* | 11/2009 | Brombach | G07C 9/00309 340/5.2 |
| 2010/0090817 A1* | 4/2010 | Yamaguchi | G07C 9/00309 340/426.35 |
| 2016/0284144 A1* | 9/2016 | Michalscheck | F16K 37/0025 |
| 2017/0026176 A1* | 1/2017 | Schmidt | H04L 9/0662 |
| 2018/0167205 A1* | 6/2018 | Moriyama | H04L 9/0866 |
| 2018/0321661 A1* | 11/2018 | Main-Reade | G05B 19/4185 |
| 2018/0354460 A1* | 12/2018 | Bartels | G07C 9/00896 |
| 2018/0356817 A1* | 12/2018 | Poeppel | H04L 67/306 |
| 2020/0065722 A1* | 2/2020 | Smith | G06Q 50/30 |
| 2020/0238950 A1* | 7/2020 | Knobloch | G06F 21/71 |
| 2020/0369242 A1* | 11/2020 | Komedani | B60R 25/24 |
| 2020/0413408 A1* | 12/2020 | Bailey | H04L 9/3239 |
| 2021/0078533 A1* | 3/2021 | Bedard | B60R 25/24 |
| 2021/0316700 A1* | 10/2021 | Bielby | B60R 25/01 |
| 2021/0382515 A1* | 12/2021 | Dubrovsky | G06N 10/00 |
| 2022/0366741 A1* | 11/2022 | Christensen | H04L 9/0891 |

\* cited by examiner

ENABLING OPERATOR CONTROLS FOR MACHINE OPERATION

BACKGROUND

There are many types of machines for which it may be desirable to control user access. For example, even if a vehicle is unlocked and/or a user is able to obtain access to the vehicle, the user is typically required to complete further steps before the vehicle will move, e.g., actuating a vehicle ignition or the like with a key, key fob, or other access control. Similarly, an industrial machine such as a stationary robot, tooling machine, etc., may be located in an environment accessible by many users, but it may be desirable to restrict use of the machine to a smaller set of users than the set of users to whom the machine is physically accessible.

DETAILED DESCRIPTION

Figure 1:
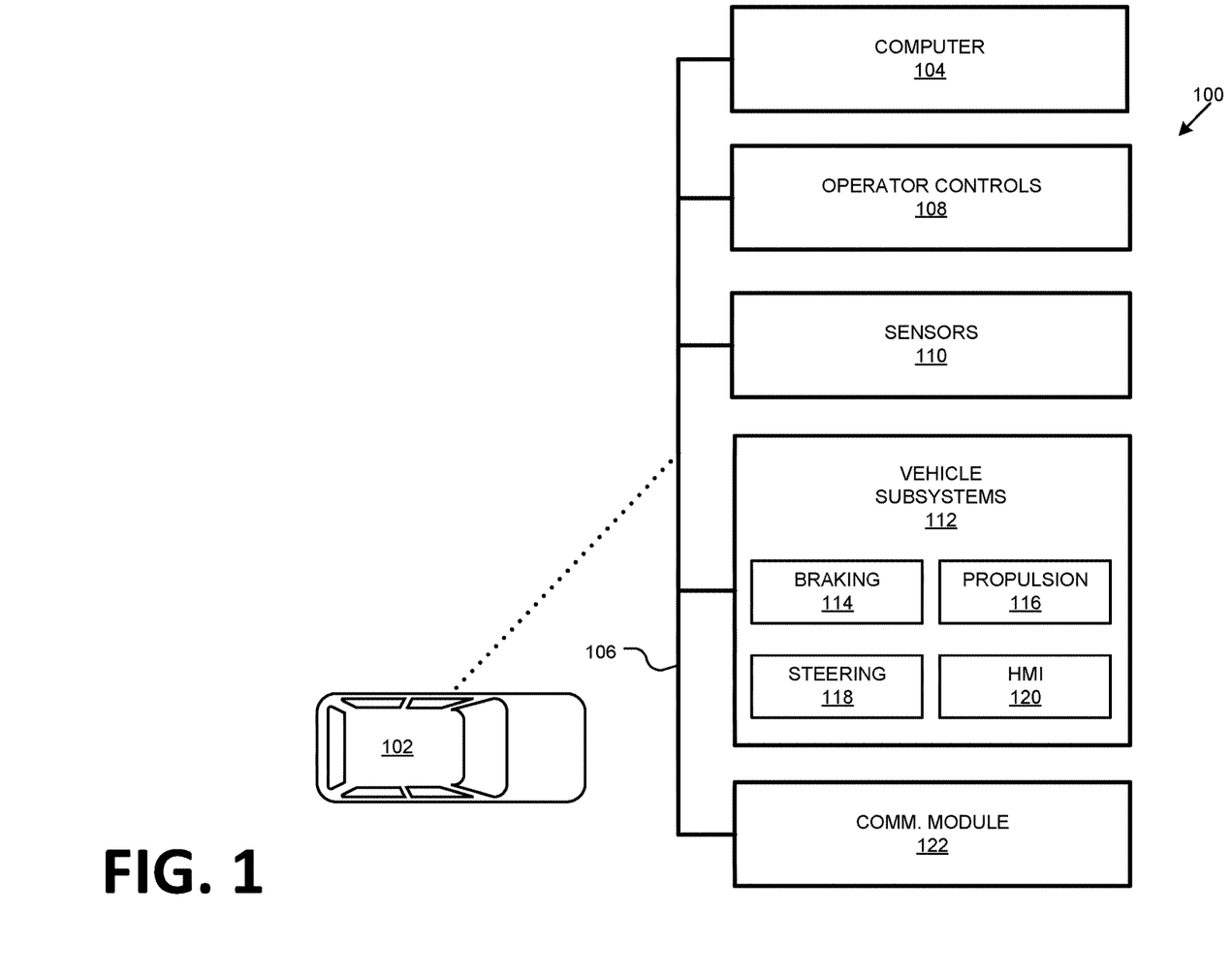
FIG. 1 illustrates an example authorization system.

Referring to FIG. 1, disclosed herein is a control system 100 for controlling, i.e., restricting or allowing, i.e., determining authorization of user access to, and/or operation of, a machine. The authorization can be performed via inputs to operator controls 108. In an exemplary implementation, the machine is a vehicle 102; non-limiting examples of operator controls 108 in a vehicle 102 implementation include any one or more of a turn signal selector, a cruise control selector, a headlamp actuator, a gear selector, a brake control, a throttle control, a steering control, a climate control, a mirror control, a window control, or a lock control. In other words, the operator controls 108 typically include controls or input mechanisms that are provided for conventional operation of the machine, i.e., the operator controls 108 are enabled, in an operation mode, to operate the machine.

For example, a computer 104 in a vehicle 102 could require that an operation mode be enabled or activated, wherein operator controls 108 typically are enabled to provide various inputs to support the operation mode, in order for an operator to provide inputs (e.g., to operator controls 108 such as a steering wheel, accelerator pedal, etc.) to move the vehicle. In a validation mode provided to determine user authorization, the operator controls 108 are disabled to operate the machine (i.e., the operation mode is disabled or unavailable) and are selectable to provide inputs for a candidate key. That is, in the validation mode, inputs to the operator controls 108 are used to obtain the candidate key that can then be compared to a stored key and used to determine whether to output the authorization allowing control and operation of the machine.

A machine as described herein comprises a plurality of operator controls enabled, in an operation mode, to operate the machine, and, in the validation mode, disabled to operate the machine and selectable to provide inputs for a candidate key. The machine further includes a computing device communicatively coupled to the operator controls, wherein the computing device is programmed to: initialize the validation mode, including initializing the candidate key and an input multiplier, wherein the input multiplier is initialized according to a number base, and a maximum storage length, of a stored key; receive a plurality of inputs to the operator controls in the validation mode; determine respective numeric values of the inputs; add the candidate key to a product of the multiplier and the numeric value of a first input to update the candidate key; for each of one or more second inputs to the operator controls after the first input to the operator controls, determine whether the candidate key matches a stored key; and upon determining that the candidate key matches the stored key, output an authorization.

The machine can be further configured to activate one or more components of the machine upon the authorization being output.

The computing device can be further programmed to exit the validation mode without outputting the authorization upon determining that more than a predetermined amount of time has elapsed without receiving one of the inputs.

The computing device can be further programmed to exit the validation mode without outputting the authorization upon determining that the candidate key does not match the stored key, and a count of the plurality of inputs matches a number of expected inputs.

The number base can be determined by a number of possible inputs for a single position of the stored key.

The stored key can be based on a plurality of calibration inputs provided in a calibration mode. The calibration inputs can be received in a predetermined subset of the operator controls included in the machine. The stored key can be downloaded to the computing device. The stored key can include padding to account for a difference between a storage length of an expected number of inputs and the maximum storage length.

The computing device can be programed to clear the candidate key in memory upon determining to exit the validation mode.

The machine can be a vehicle. The computing device can be an electronic control unit in the vehicle. The operator can control include at least one of a turn signal selector, a cruise control selector, a headlamp actuator, a gear selector, a brake control, a throttle control, a steering control, a climate control, a mirror control, a window control, or a lock control. The vehicle can be permitted to move only when in the operation mode.

An example vehicle 102 includes an authorization computer 104 that is one of a plurality of computing devices included in the vehicle 102. Computing devices in the vehicle 102 can receive data via a vehicle network 106 from various devices and/or systems in the vehicle 102, such as operator controls 108 and vehicle 102 sensors 110. Further, the vehicle 102 includes a plurality of vehicle subsystems 112, including a braking subsystem 114, a propulsion subsystem 116, a steering subsystem 118, and/or a human machine interface (HMI) 120; these vehicle subsystems 112 are typically arranged on the vehicle network 106 for communication with computing devices such as the computer 104.

A vehicle 102 may be any suitable type of ground vehicle 102, e.g., a passenger or commercial automobile such as a sedan, a coupe, a truck, a sport utility, a crossover, a van, a minivan, a taxi, a bus, etc. Further, a vehicle 102 herein could be a boat or aircraft. Moreover, as noted above, the present principles could be implemented in machines other than vehicles 102.

The vehicle 102 computer 104 includes a processor and a memory. The memory includes one or more forms of computer 104 readable media, and stores instructions executable by the vehicle 102 computer 104 for performing various operations, including as disclosed herein. For example, the computer 104 can be a generic computer 104 with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers, or any volatile or non-volatile media. The memory can store the collected data sent from the sensors 110. The memory can be a separate device from the computer 104, and the computer 104 can retrieve information stored by the memory via a vehicle network 106, i.e., one or more communications mechanisms in the vehicle 102 for components in the vehicle 102 to communicate with one another, e.g., over a CAN bus, a wireless network, etc. Alternatively or additionally, the memory can be part of the computer 104, e.g., as a memory of the computer 104. The computer 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer 104, as opposed to a human operator, is to control such operations. Additionally, the computer 104 may be programmed to determine whether and when a human operator is to control such operations.

The computer 104 may include or be communicatively coupled to, e.g., via a vehicle network 106 such as a communications bus as described further below, more than one processor, e.g., included in components such as sensors 110, electronic controller units (ECUs) or the like included in the vehicle 102 for monitoring and/or controlling various vehicle 102 components, e.g., a powertrain controller, a brake controller, a steering controller, etc. The computer 104 is generally arranged for communications on a vehicle 102 communication network that can include a bus in the vehicle 102 such as a controller area network (CAN) or the like, and/or other wired and/or wireless mechanisms. Alternatively or additionally, in cases where the computer 104 actually comprises a plurality of devices, the vehicle 102 communication network may be used for communications between devices represented as the computer 104 in this disclosure. Further, as mentioned below, various controllers and/or sensors 110 may provide data to the computer 104 via the vehicle 102 communication network.

The vehicle network 106 can include a conventional vehicle 102 communications bus such as a CAN bus, LIN bus, etc., and or other wired and/or wireless technologies, e.g., Ethernet, Wi-Fi®, cellular, Bluetooth®, Bluetooth® Low Energy (BLE), etc. Via the network, bus, and/or other wired or wireless mechanisms (e.g., a wired or wireless local area network in the vehicle 102). Accordingly, a vehicle 102 computer 104, ECU etc., may transmit messages to various devices in a vehicle 102 and/or receive messages from the various devices, e.g., ECUs, controllers, actuators, sensors 110, etc.

The braking subsystem 114 resists the motion of the vehicle 102 to thereby slow and/or stop the vehicle 102. The braking subsystem 114 may include friction brakes such as disc brakes, drum brakes, band brakes, and so on; regenerative brakes; any other suitable type of brakes; or a combination. The braking subsystem 114 is in communication with and receives input from the computer 104 and/or a human operator. The human operator may control the braking subsystem 114 via, e.g., a brake pedal.

The propulsion subsystem 116 may include one or more of an internal combustion engine, electric motor, hybrid engine, etc.

The steering subsystem 118 controls the turning of the wheels. The steering subsystem 118 is in communication with and receives input from a steering wheel and/or the computer 104. The steering subsystem 118 may include a rack-and-pinion system with electric power-assisted steering, a steer-by-wire system, e.g., such as are known, or any other suitable system.

The vehicle 102 can include an HMI 120 (human-machine interface), e.g., one or more of a display, a touchscreen display, a microphone, a speaker, etc. The user can provide input to devices such as the computer 104 via the HMI 120. The HMI 120 can communicate with the computer 104 via the vehicle network 106, e.g., the HMI 120 can send a message including the user input provided via a touchscreen, microphone, a camera that captures a gesture, etc., to a computer 104, and/or can display output, e.g., via a screen, speaker, etc.

The authorization computer 104, as mentioned above, can be communicatively coupled to the operator controls 108, e.g., via the vehicle network 106. An operator control in the context of this document is a physical element in a vehicle (e.g., a button, knob, switch, etc.) whose state can be changed by a user (e., a button can be pressed, a knob can be pressed and/or turned, a switch can be moved, etc.). An operator control is typically provided for conventional vehicle operations, e.g., activating or deactivating lights, cruise control, etc. The authorization computer can receive inputs from operator controls 108 via the vehicle network 106, i.e., signals or data messages specifying that the input has been received. For example, an input from an operator control 108 can specify that a state of the operator control 108, such as a position of a knob, switch, or lever, has changed and/or a description of a current state of the operator control 108 (e.g., cruise on/off switch is on, turn signal lever is in up position, etc.). A non-limiting list of example operator controls 108 in a vehicle 102 includes a turn signal selector, a cruise control selector, a headlamp actuator, a gear selector, a brake control, a throttle control, a steering control, a climate control, a mirror control, a window control, or a lock control.

As stated above, the operator controls 108 can be used to input a candidate key. Thus, specific inputs to operator controls 108 can be mapped to or assigned to a range of numbers (specifically, non-negative integers) where the range of numbers is defined by a base number of a stored key. For example, the base number could be three, in which case the range of numbers represented in inputs to operator controls 108 would be zero to two (i.e., 0, 1, 2). In another example, the base number could be ten, in which case the range of numbers represented in inputs to operator controls 108 would be zero to nine (i.e., 0, 1, 2, 3, 4, 5 6, 7, 8, 9). Table 1 below shows a possible mapping of operator controls 108 where a stored key is represented as a base three number. Table 2 below shows a possible mapping of operator controls 108 where a stored key is represented as a base ten number.

TABLE 1

| Control input | Assigned value |
| --- | --- |
| Turn signal stalk up | 0 |
| Turn signal stalk down | 1 |
| Turn signal stalk pulled toward vehicle rear | 2 |

TABLE 2

| Control input | Assigned value |
| --- | --- |
| Empty (i.e., no input) | 0 |
| Cancel | 1 |
| Off | 2 |
| On | 3 |
| On/Off | 4 |
| On/Off/Cancel | 5 |
| Resume | 6 |
| Resume/Cancel | 7 |
| Set-minus | 8 |
| Set-plus | 9 |

Note that Table 2 includes various inputs that would not be included in a vehicle 102 together, and also provides for a placeholder in a calibration key to specify that no input will be received, i.e., typically used where a user entering a calibration key provides fewer inputs than the permitted number of inputs, whereupon the "empty" value can be included, typically as trailing right padding. That is, a number based for a stored key could be determined by a distinct number of different inputs possible in a specific vehicle 102 (or type of vehicle 102), e.g., as is possible with the inputs illustrated in Table 1. However, as illustrated in Table 2, a number based for a stored key could be determined by a distinct number of different inputs possible across a plurality of vehicles 102 (or types of vehicle 102), Wherein no specific vehicle 102 would include all of the possible inputs used to determine the base number. That is, for example, a single vehicle 102 could have a cruise control that would include either "Off" and "On" controls, or would include an "On/Off" control, but would not include all of these. In any event, the number base for a stored key is determined by a number of possible inputs for a single position of the stored key, i.e., a range of numbers possible for the position (two for base two, three for base three, etc.).

As described further below, in what is referred to as a calibration mode, a user could provide input to determine a stored key, whereupon and the key could be stored, along with a base number for the key typically provided by a vehicle 102 manufacture according to the control inputs permitted for the stored key. Further, the authorization computer 104 will typically include a maximum amount of memory for a stored key, and will store a maximum length for a stored key based on the maximum amount of memory. Thus, to obtain a stored key, a calibration key entered by a user key is padded, typically with trailing zeros, as needed to achieve a stored key of the maximum length. That is, a stored key typically includes padding to account for a difference between a storage length of an expected number of inputs and the maximum storage length. For example, suppose in a calibration mode where a key was to be stored as a base 10 number, a user entered the string "04543." Previewing the discussion of Table 3 below, further suppose that the maximum length for a stored key was 9 digits of a base 10 number. Then the calibration key entered by a user would be padded to form a stored key of a maximum length of nine, i.e., "045430000."

Examples herein will assume that the maximum amount of memory is 32 bits, but of course other amounts of memory could be provided. In any event, the maximum length is determined by determining a maximum number of digits in the number base that can be stored in the available maximum memory. Table 3 below provides examples of maximum lengths of stored keys with 32 bits of memory is available.

TABLE 3

| Number base | Largest number that can be stored in base 2 | Max Length |
| --- | --- | --- |
| Base 2 | 11111111111111111111111111111111 | 32 |
| Base 3 | 10200202220122111110 | 20 |
| Base 10 | 4,294,967,295 | 9 |

In a base two system, given 32 bits, as seen in Table 3, the largest number that can be stored is a string of 32 ones, i.e., 11111111111111111111111111111111. This number in base 3 is 10200202220122111210, i.e., a string of 21 digits, and is 4,294,967,295 in base 10, i.e., a string of 10 digits. However, the maximum length in base three for a stored key in this example is 20 digits, and nine digits in base 10. This is because, in each case, 32 bits of memory is not enough to store a full range of possible digits, i.e., number values for the leftmost digit in the string. For example, 32 bits of memory would not be enough to store $20200202220122111112103$ or $5,294,967,295_{10}$ (the subscripts indicating base 3 and base 10, respectively).

The authorization computer 104 can be programmed to initialize a validation mode in which the operator controls 108 are disabled to operate the vehicle 102 and are selectable to input a candidate key that can be used to determine user authorization for the machine. Initializing the validation mode includes initializing a candidate key value and an input multiplier, wherein the input multiplier is initialized according to a number base, and a maximum storage length, of a stored key value. In the exemplary implementation discussed herein, the candidate key value is a hash value, i.e., a value returned according to a specified mathematical function to obtain a desired value, i.e., a number that can be used to obtain a match with a stored key. The number base is typically a stored value determined according to a number of possible inputs to form a stored key, as described above with respect to Tables 2 and 3. The input multiplier, which is applied to inputs forming the candidate key as described further below, can be the number base raised to a power determined based on the maximum storage length of the key value, i.e., the input multiplier is typically initialized as the number base raised to the maximum storage length 1 minus 1, i.e., where n is the number base and 1 is the maximum storage length, the multiplier m is given as follows:

$$m = n^{l-1}$$

The input multiplier is then adjusted and applied during various iterations of a process in a validation mode, as described further below.

Once the validation mode is initialized, the authorization computer 104 can, in the validation mode, receive a plurality of inputs to the operator controls 108. The computer 104 can store numeric values assigned to respective operator controls 108 and/or states of or inputs to operator controls 108, e.g., based on an assignment or mapping as described above. Thus, on receiving respective inputs to operator controls 108, the computer 104 can determine numeric values of the inputs.

The candidate key can be initialized to a value of zero. Then, when a numeric value for a first input is determined, the candidate key can be added to a product of the input multiplier and the numeric value of the first input. That is, if the candidate key is initialized to a value of zero, after the first input then the candidate key is updated to the product of the input multiplier and the numeric value of the first input.

Subsequently, for each of one or more second inputs to the operator controls 108 after the first input to the operator controls 108, the candidate key is similarly updated. Further, after each second input, the authorization computer 104 can determine whether the candidate key matches a stored key. It is possible that a stored key could be two digits or even one digit. However, in practice, a stored key typically will be more than two digits to reduce a likelihood of an unauthorized user guessing the key. Upon determining that the candidate key matches the stored key, the computer 104 can output an authorization. An "authorization" means that the computer 104 has activated an operation mode in which one or more operator controls 108 can be activated to provide input to operate a machine such as the vehicle 102. Put another way, the computer 104 providing the authorization means that the computer 104 has activated one or more components of the machine upon the authorization being output.

Table 4 below illustrates an example of a candidate key being entered and matched to a stored key based on inputs to operator controls 108 in a validation mode. In this example, the stored key is a base three number that is four digits long, specifically, the stored key in this example is "12120000000000000000," i.e., the trailing zeros are padding as described above and a user must enter a sequence 1-2-1-2 to match the stored key. In the example of Table 4, the candidate key is initialized to a value of zero, and the multiplier is initialized as 3^19, i.e., the base number raised to a power one less than the maximum length of 20. As seen in Table 4, the multiplier is divided by the base number, i.e., the power applied to the base number is reduced by one, to update the candidate key for each subsequent input.

TABLE 4

| Input No. | Input Value | Multiplier | Candidate Key |
|---|---|---|---|
| First | 1 | $3^{19}$ | $(1 \times 3^{19})_{10} + (0)_{10} = (1162261467)_{10}$ |
| Second | 2 | $3^{18}$ | $(2 \times 3^{18})_{10} + (1162261467)_{10} = (1937102445)_{10}$ |
| Third | 1 | $3^{17}$ | $(1 \times 3^{17})_{10} + (1937102445)_{10} = (2066242268)_{10}$ |
| Fourth | 2 | $3^{16}$ | $(2 \times 3^{16})_{10} + (2066242608)_{10} = (2152336050)_{10}$ |

Operations in Table 4 are shown with base 10 numbers for the convenience of the reader, and also because such operations would probably be shown in base 10 in human-readable computer code programming the computer 104. Upon receiving a first input, having a value of "1," the initial multiplier of $3^{19}$ is multiplied by the input value, and the product is then added to the candidate key, i.e., in this first iteration, zero, that being the initialized value of the candidate key. Upon receiving the second input, having a value of "2," the multiplier, now $3^{18}$, is multiplied by the input value, and the product is then added to the candidate key to update the candidate key. This procedure is repeated after the third and fourth inputs. The computer 104 can compare the candidate key to the stored key after each generation, i.e., after receiving each of the first, second, third, and fourth inputs. Upon determining a match between the candidate key and the stored key, which in this example will happen after the fourth input is received, (i.e., $12120000000000000003 = 2152336050_{10}$), the computer 104 can then output the authorization.

The computer 104 can be programmed to exit the validation mode without outputting the authorization upon determining that more than a predetermined amount of time has elapsed without receiving one of the inputs. Put another way, there can be a timeout period for entering inputs to form a candidate key. For example, if more than five or ten seconds passes between inputs, the computer 104 could be programmed to exit the validation mode. Further, the computer 104 can be programmed to exit the validation mode without outputting the authorization upon determining that the candidate key does not match the stored key, and a count of the plurality of inputs matches a number of expected inputs; the number of expected inputs can be stored in the computer 104, e.g., captured when a calibration key is entered.

Figure 2:
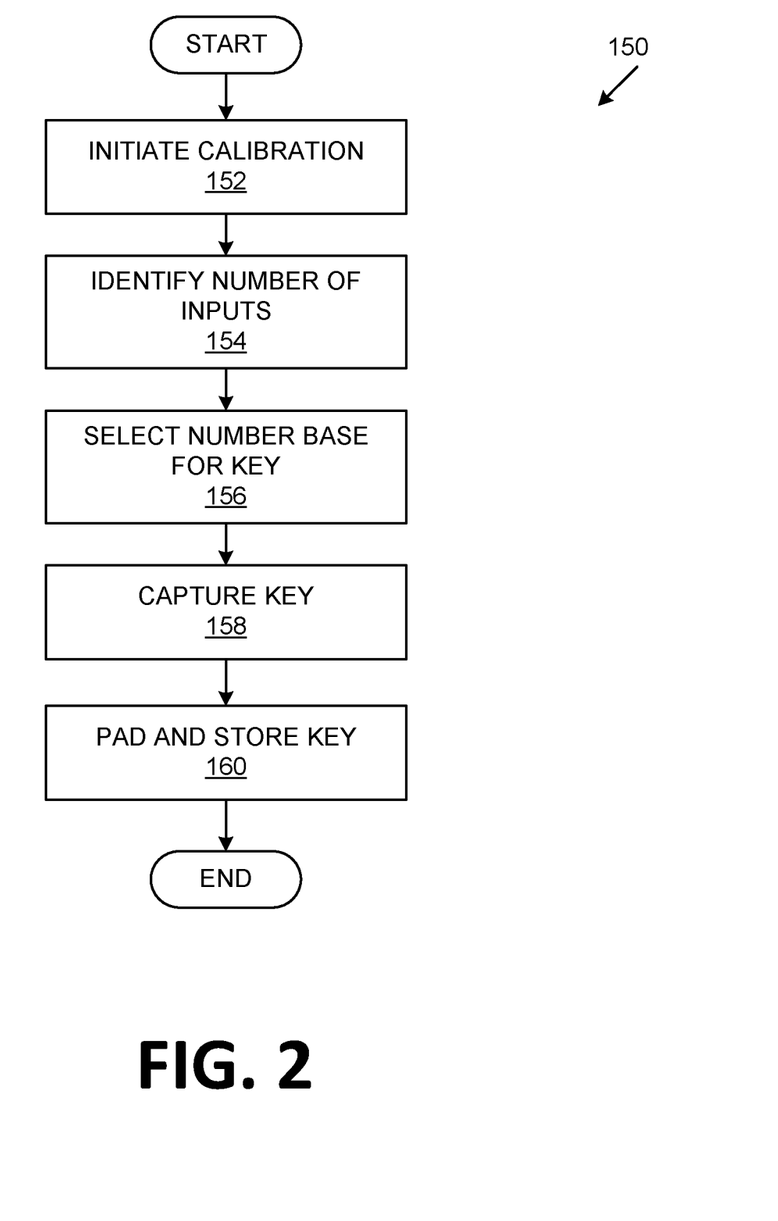
FIG. 2 illustrates an example process for capturing a calibration key and generating and storing a stored key.

FIG. 2 illustrates an example process for capturing a calibration key and generating and storing a stored key. As mentioned above, the stored key is based on a plurality of calibration inputs, i.e., a calibration key, provided in a calibration mode. The calibration inputs are received operator controls 108 included in a machine such as a vehicle, typically in a predetermined subset of operator controls 108 designated for mapping to a stored key.

The process 150 can begin in a block 152, in which the computer 104 initializes the calibration mode. For example, the computer 104 may receive user input to begin the calibration mode. User input could be provided, e.g., via an HMI 120 or the like in a vehicle 102. The user could provide input to begin a calibration mode and/or enter a passcode or the like to be compared to a stored passcode in a memory of the computer 104 to permit activating the calibration mode.

Next, in a block 154, the computer 104 identifies a set of inputs to operator controls 108 that could be used to generate a stored key. For example, the computer 104 could store available operator controls 108, and states of operator controls 108, as described above, available to receive inputs for user entry of digits forming a key. Alternatively or additionally, an operator could provide input, e.g., via a vehicle 102 HMI 120, specifying a set of operator controls 108 to be used to receive inputs for the key being stored.

Next, in a block 156, the computer 104 selects a number base for the key. As described above, the number base is selected according to a number of possible inputs to enter a fee.

Note that the blocks 154 and 156 could be omitted. That is, the computer 104 could be provided with the set of inputs to operator controls 108 that could be used to generate the stored key by a manufacturer of a machine such as a vehicle 102, the stored key could be downloaded to the computer 104 via a communication module 122, etc. In that case, a number of inputs and a number base for a key could be stored in the computer 104 memory.

Next, in a block 158, the computer 104 captures inputs for a calibration key. For example, a vehicle 102 HMI 120 could provide prompts for a user to provide various inputs to operator controls 108. The HMI 120 could provide output to a user specifying a number of inputs to be provided and/or a user can provide input to the HMI 120 specifying a number of inputs to be provided, a number of inputs corresponding to a number of digits that a user will have to input for a candidate key to match be stored key. The computer 104 could then receive the inputs, e.g., the user could perform a sequence of inputs to operator controls 108, e.g., selecting buttons, switches, knobs, etc. in a vehicle 102, to specify the inputs, and hence the digits, to be included in a stored key.

Next, in a block 160, the computer 104 pads the calibration key as described above, and stores the padded key in a memory.

Following the block 160, the process 150 ends.

Figure 3:
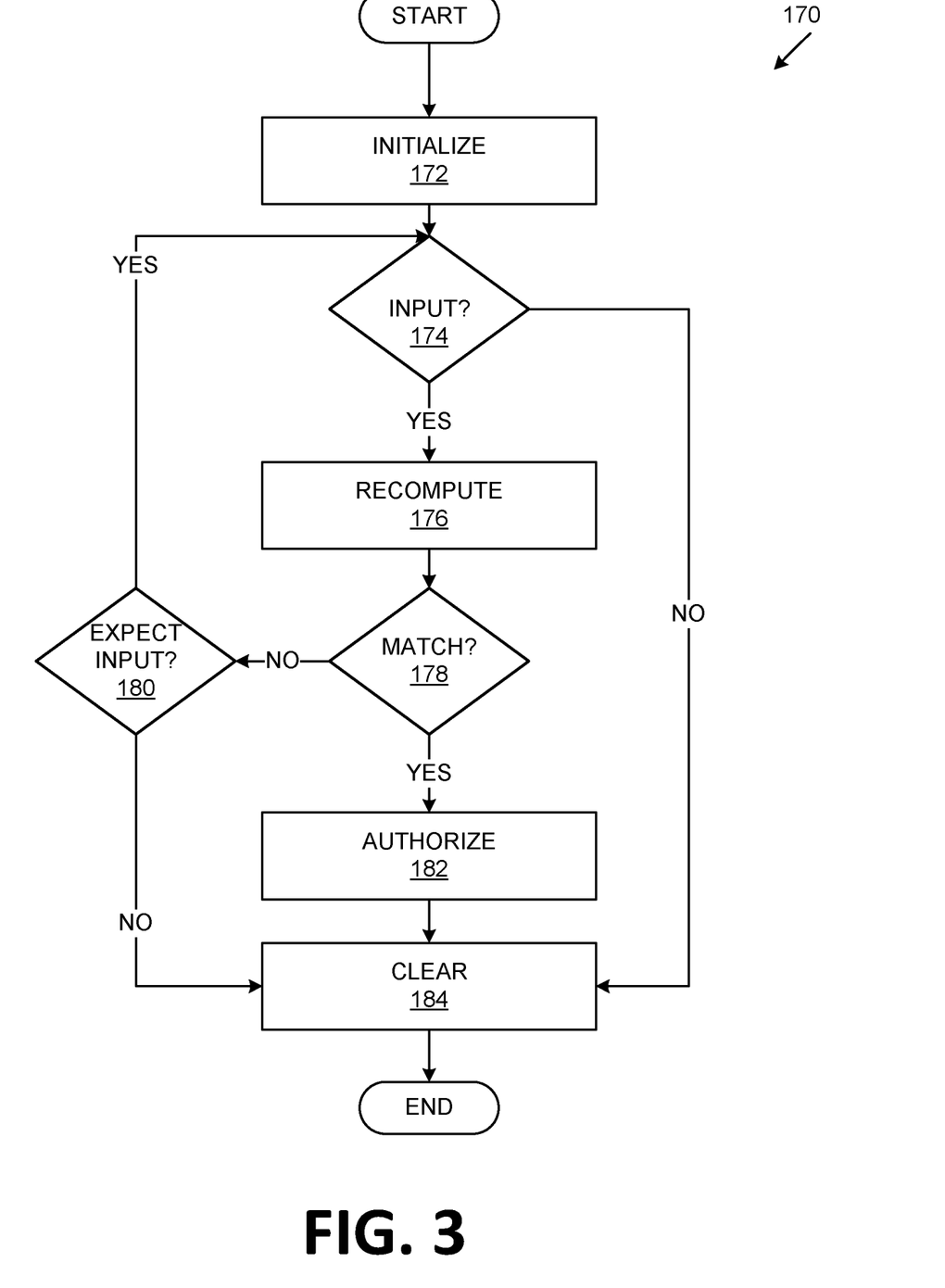
FIG. 3 illustrates an example process for authorizing operation of a machine.

FIG. 3 illustrates an example process for authorizing operation of a machine.

The process 170 can be executed by a processor of the computer 104 according to instructions stored in a memory thereof.

The process 170 can begin in a block 172, in which a validation mode is initialized. The computer 104 can receive input to initialize the validation mode in various ways. For example, in a vehicle 102, a validation mode could be initialized when a vehicle 102 door is opened, when an occupancy sensor detects a user in a vehicle 102 seat when the vehicle 102 is in an off state (i.e., an operation mode is disabled), a user provides an input to initiate the validation mode when the vehicle 102 is in the off state, e.g., selecting an operator control 108 used to provide input for a candidate key, etc.

Next, in a block 174, the computer 104 determines whether an input has been received to an operator control 108, e.g., by monitoring during a timeout. As described above. If an input is received, then the process 170 proceeds to a block 176. Otherwise, the process 170 proceeds to a block 184.

In the block 176, the computer 104 re-computes the candidate key value, i.e., as initialized in the block 172, or as recomputed in a previous iteration of the block 176. For example, re-computing the candidate key value is illustrated by and discussed above with respect to Table 4.

Next, in a block 178, the computer 104 determines whether the candidate key output from the block 176 matches a stored key, e.g., as described above. If no, the process 170 proceeds to a block 180. If yes, the process 170 proceeds to a block 182.

In the block 180, the computer 104 determines whether another input is expected to form a candidate key that can be compared to a stored key, e.g., based on a stored number of expected digits, a number of digits in a stored key (accounting for padding), etc. if another input is expected, then the process 170 returns to the block 174. Otherwise, the process 170 proceeds to the block 184.

In the block 182, the candidate key having matched the stored key, the computer 104 outputs an authorization, e.g., to enable an operation mode, to permit user access to one or more components of a vehicle 102, etc.

In the block 184, which can follow either of the blocks 174, 180, 184, the computer 104 determines to exit the validation mode and clears the candidate key value and other initialized values, such as the multiplier, from memory. Following the block 184, the process 170 ends.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer 104 readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, any other physical medium with patterns of holes, a RAM, a PROM, an EPROM, a FLASH EEPROM, any other memory chip or cartridge, or any other medium from which a computer can read.

The term "exemplary" is used herein in the sense of signifying an example, e.g., a reference to an "exemplary widget" should be read as simply referring to an example of a widget.

Use of "in response to," "based on," and "upon determining" herein indicates a causal relationship, not merely a temporal relationship.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

The invention claimed is:

1. A machine, comprising:
  a plurality of operator controls enabled, in an operation mode, to operate the machine, and, in a validation mode, disabled to operate the machine and selectable to provide inputs for a candidate key;
  a computing device communicatively coupled to the operator controls, wherein the computing device is programmed to:
  initialize the validation mode, including initializing the candidate key and an input multiplier, wherein the input multiplier is initialized according to a number base, and a maximum storage length, of a stored key;

receive a plurality of inputs to the operator controls in the validation mode;

determine respective numeric values of the inputs;

add the candidate key to a product of the multiplier and the numeric value of a first input to update the candidate key;

for each of one or more second inputs to the operator controls after the first input to the operator controls, determine whether the candidate key matches the stored key; and upon determining that the candidate key matches the stored key, output an authorization.

2. The machine of claim 1, further configured to activate one or more components of the machine upon the authorization being output.

3. The machine of claim 1, wherein the computing device is further programmed to exit the validation mode without outputting the authorization upon determining that more than a predetermined amount of time has elapsed without receiving one of the inputs.

4. The machine of claim 1, wherein the computing device is further programmed to exit the validation mode without outputting the authorization upon determining that the candidate key does not match the stored key, and a count of the plurality of inputs matches a number of expected inputs.

5. The machine of claim 1, wherein the number base is determined by a number of possible inputs for a single position of the stored key.

6. The machine of claim 1, wherein the stored key is based on a plurality of calibration inputs provided in a calibration mode.

7. The machine of claim 6, wherein the calibration inputs are received in a predetermined subset of the operator controls included in the machine.

8. The machine of claim 1, wherein the stored key is downloaded to the computing device.

9. The machine of claim 1, wherein the stored key includes padding to account for a difference between a storage length of an expected number of inputs and the maximum storage length.

10. The machine of claim 1, wherein the computing device is further programed to clear the candidate key in memory upon determining to exit the validation mode.

11. The machine of claim 1, wherein the machine is a vehicle.

12. The machine of claim 11, wherein the computing device is an electronic control unit in the vehicle.

13. The machine of claim 11, wherein the operator controls include at least one of a turn signal selector, a cruise control selector, a headlamp actuator, a gear selector, a brake control, a throttle control, a steering control, a climate control, a mirror control, a window control, or a lock control.

14. The machine of claim 11, wherein the vehicle is permitted to move only when in the operation mode.

* * * * *